Nov. 22, 1966  G. J. RIEPEN  3,286,760
TIRE CHANGER ADAPTER
Filed May 27, 1965  2 Sheets-Sheet 1

Garman J. Riepen
INVENTOR.

BY
Attorneys

Garman J. Riepen
INVENTOR.

United States Patent Office 3,286,760
Patented Nov. 22, 1966

3,286,760
TIRE CHANGER ADAPTER
Garman J. Riepen, Box 60, R.R. 2, Osage City, Kans.
Filed May 27, 1965, Ser. No. 459,240
7 Claims. (Cl. 157—1.1)

This invention relates to a novel and useful tire changer adapter and more specifically to an apparatus for use on a vehicle wheel having a large central opening and to adapt that wheel for use on a tire changer machine designed to support a vehicle wheel having a small central opening therein.

Substantially all conventional late model wheel rims manufactured in this country and designed for use on passenger vehicles are provided with a generally flat central portion of circular configuration having a plurality of mounting apertures formed therein and disposed in a circular pattern about the outer periphery of the flat central portion. In addition, this flat central portion is provided with a small central aperture or opening adapted to receive therethrough the outwardly projecting hub or spindle portion on the front wheels of an associated vehicle. Inasmuch as substantially all passenger car wheel rims manufactured in this country are of the aforementioned type, wheel changing machines are designed to support and handle this particular type of wheel rim and most are designed to include a central upright adapted to be received through the aforementioned small central opening and are provided with inverted truncated cone-shaped members slidable on the upright and capable of being at least partially received through the central opening in a manner to stationarily secure and clamp a vehicle wheel on such a tire changing machine.

Unlike most passenger car wheels manufactured in this country, some wheel rims provided on foreign automobiles imported in great quantities into this country are provided with larger central openings which have a diameter greater than the diameter of the circular pattern of the mounting apertures formed in the aforementioned conventional wheel rims manufactured in this country, and as a result most wheel changing machines are not adapted to handle this type of foreign wheel rim.

The main object of this invention is to provide an adapter for the aforementioned wheel changing machines which will enable these machines to readily handle the aforementioned types of foreign wheel rims provided with large central openings.

Another object of this invention is to provide a tire changing adapter including means whereby foreign manufactured wheel rims of the aforementioned type and including outwardly projecting hub cap securing clips may be handled by the tire changing machine and have tire casings removed therefrom in a conventional manner by utilizing the various accessories provided with a tire changing machine without encountering any interference between the tire changing machine accessories and the outwardly projecting hub cap retaining clips of the foreign manufactured wheels or wheel rims.

A final object of this invention to be specifically enumerated herein is to provide a tire changing adapter for a tire changing machine in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
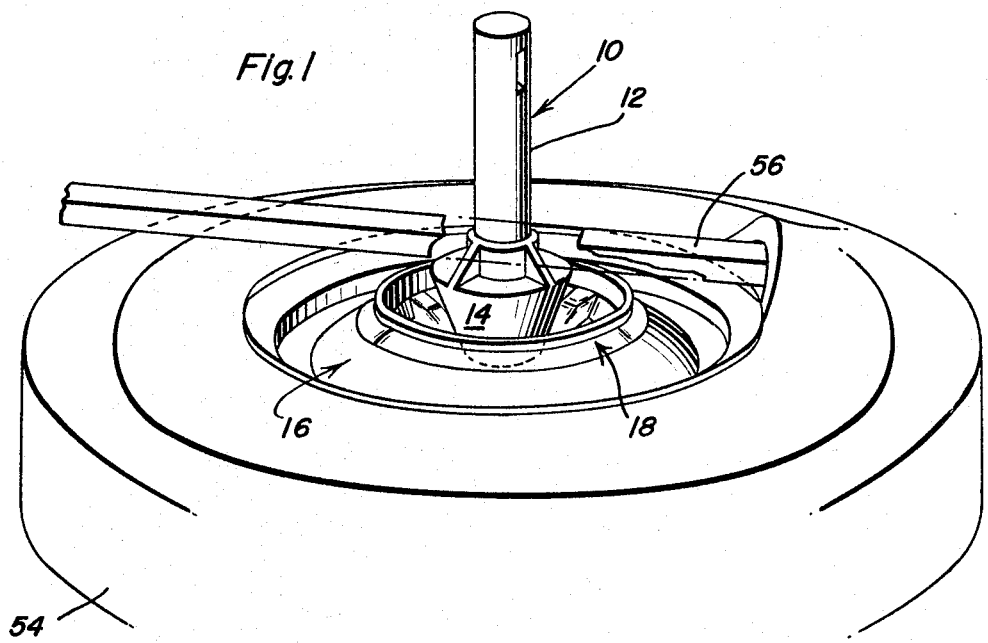
FIGURE 1 is a perspective view of a foreign manufactured wheel rim of the above mentioned type shown mounted on a conventional form of tire changing machine and with the tire changing adapter of the instant invention being operatively mounted between the inverted holddown cone of the tire changing machine and the foreign manufactured wheel rim.
Figure 5:
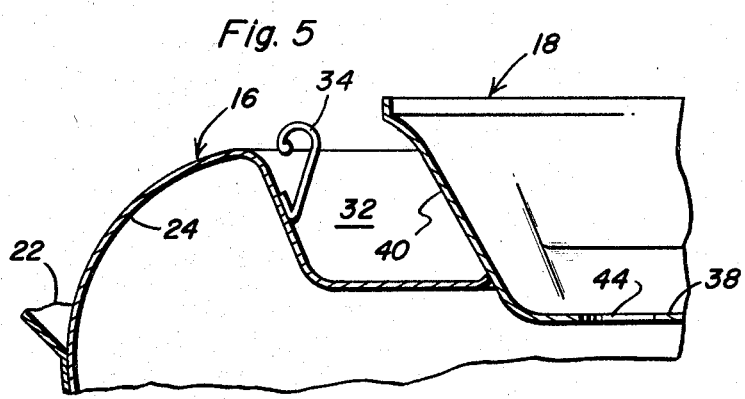
FIGURE 5 is a fragmentary enlarged vertical sectional view taken substantially upon the plane indicated by section line 5—5 of FIGURE 2.

Referring now more specifically to the drawings the numeral 10 generally designates a conventional form of tire changing machine including an upstanding support 12 having an inverted truncated cone-shaped holddown member 14 slidably mounted thereon. A foreign manufactured wheel or wheel rim is generally designated by the reference numeral 16 and is supported from the tire changing machine 10 in the conventional manner excepting that the tire changing adapter of the instant invention generally designated by reference numeral 18 is interposed between the holddown member 14 and the wheel rim 16.

Figure 2:
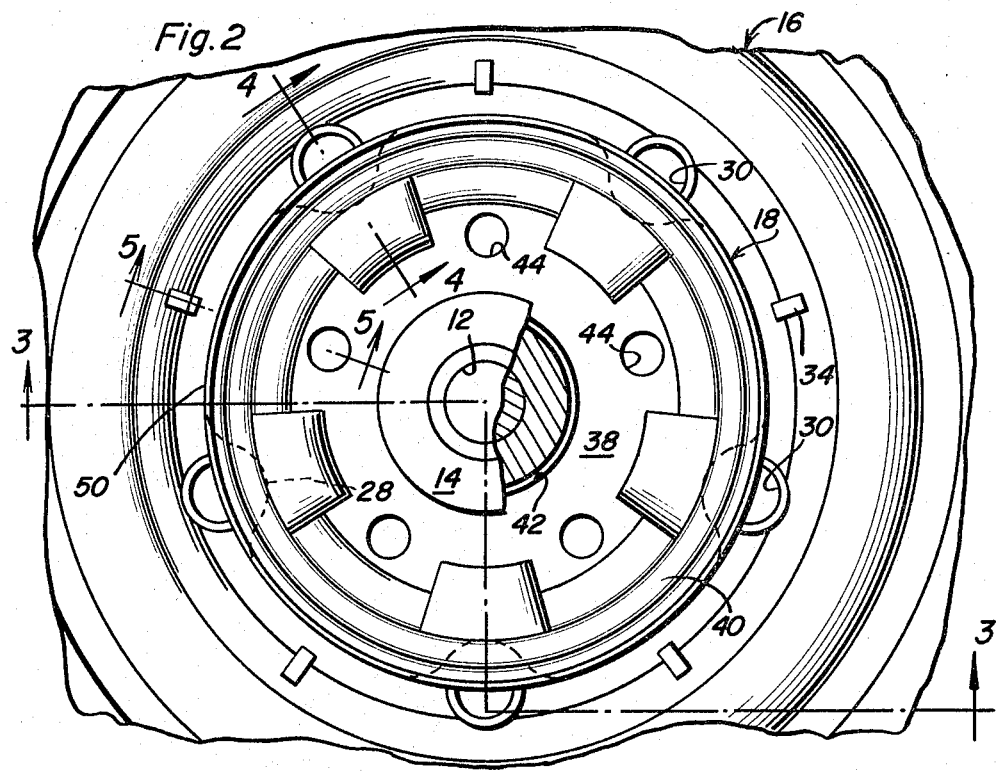
FIGURE 2 is an enlarged fragmentary top plan view of the embodiment illustrated in FIGURE 1 and with parts broken away and shown in horizontal section.
Figure 3:
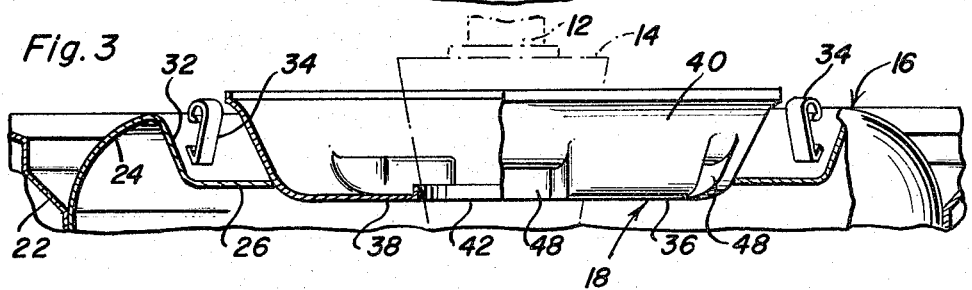
FIGURE 3 is a fragmentary vertical sectional view taken substantially upon the plane indicated by the section line 3—3 of FIGURE 2.
Figure 4:
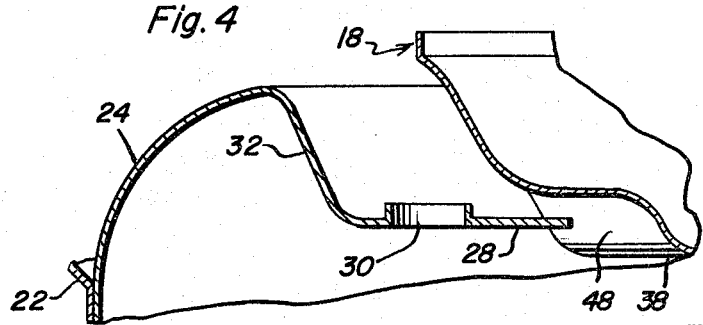
FIGURE 4 is an enlarged fragmentary vertical sectional view taken substantially upon the plane indicated by section line 4—4 of FIGURE 2.

With attention now invited more specifically to FIGURES 2 and 3 of the drawings it may be seen that the wheel rim 16 includes an outer annular rim portion 22 supported from a generally circular center or web portion 24 which includes a recessed annular mounting flange portion 26. The mounting flange portion 26 includes mounting bosses 28 which project inwardly of the inner circumferential marginal portion of the mounting portion 26 and which are provided with wheel mounting apertures 30.

The mounting flange portion 26 is supported from the center or web portion 24 by means of an outwardly opening truncated cone-shaped portion 32 and a plurality of hub cap retaining spring clips 34 are secured to and project outwardly from the cone-shaped portion 32.

The adapter 18 of the instant invention comprises a generally dish-shaped member 36 including a generally circular bottom wall 38 whose outer circumferential edge portions curve upwardly into upstanding outer peripheral wall portions 40. The bottom wall 38 is centrally apertured as at 42 to correspond to the small central aperture formed in conventional passenger car wheel rims manufactured in this country and it is also provided with a plurality of wheel mounting apertures 44 arranged in a circular pattern and corresponding to the pattern of the wheel mounting apertures of conventional wheel rims manufactured in this country.

Still further, the wall portions 40 include inwardly deflected portions 48 which are spaced circumferentially thereabout and define downwardly and outwardly opening recesses for seatingly receiving the inwardly projecting mounting bosses 28 of the wheel rim 16. Accordingly, it may be seen that the minor diameter end portion of the attachment 18 is receivable in the large central opening 50 formed in the wheel rim 16 and into which the mounting bosses 28 project. The mounting bosses are seatingly received in the recesses 48 and thereby provide a plurality of circumferentially spaced support points for the attachment 18. The holddown member 14 is of course seatingly receivable in the small central opening 42 formed in the adapter or attachment 18 and therefore it may be seen that the wheel changing machine 10 may be operated in a conventional manner in order to remove the tire casing 54 from the wheel rim 16. Further, it may be seen that the wall portions 40 terminate upwardly in a plane disposed above the upper ends of the hub cap retaining spring clips 34 and therefore that the accessory bar 56 of the machine 10 may be used in the conventional manner without the bar 56 engaging and damaging the hub cap retaining spring clips 34.

The wheel mounting apertures 44 are provided to receive upwardly projecting and vertically movable positioning fingers which are provided on some wheel changing machines for the purpose of more positively positioning and supporting the wheel rim on which tire changing operations are to be performed.

In summary, the tire changer adapter of the instant invention provides a means whereby foreign manufactured wheel rims such as those utilized on Volkswagen automobiles and including large central openings may be conveniently supported from a conventional wheel tire changing machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tire changer adapter for use on a vehicle wheel having a central opening formed therein, said adapter comprising a generally dish-shaped member including a generally circular bottom wall whose circumferential edge portions curve upwardly into upstanding outwardly divergent outer peripheral wall portions, said bottom wall being of a diameter adapted to be seatingly received in said central opening, said bottom wall having a small central opening formed therein adapted to receive the lowermost portion of an inverted cone-shaped holddown member of a tire changing machine.

2. The combination of claim 1 wherein said upstanding outer peripheral wall portions extend to a height above said bottom wall a distance adapted to project at least slightly above hub cap retaining clips secured to said wheel and disposed outwardly of the central opening therein.

3. The combination of claim 1 wherein said wheel is of the type including apertured mounting bosses projecting inwardly of the central opening in said wheel, said upstanding peripheral wall portions, adjacent their lower ends, including inwardly deflected portions defining downwardly and outwardly opening recesses adapted to seatingly receive the inwardly projecting portions of said bosses.

4. The combination of claim 1 wherein said bottom wall includes a plurality of circumferentially spaced apertures arranged in a circular pattern adapted to correspond to the pattern of mounting apertures formed in said wheel.

5. The combination of claim 4 wherein said wheel is of the type including apertured mounting bosses projecting inwardly of the central opening in said wheel, said upstanding peripheral wall portions, adjacent their lower ends, including inwardly deflected portions defining downwardly and outwardly opening recesses adapted to seatingly receive the inwardly projecting portions of said bosses.

6. The combination of claim 5 wherein said upstanding outer peripheral wall portions extend to a height above said bottom wall a distance adapted to project above hub cap retaining clips secured to said wheel and disposed outwardly of said mounting bosses.

7. A tire changer adapter for use on a vehicle wheel having a central opening formed therein, said adapter including a bottom wall provided with a central opening, the outer marginal edge portions of said bottom wall including upwardly and outwardly inclined peripheral wall portions, said bottom wall being of a size adapted to be received downwardly through said opening in said wheel, said upwardly and outwardly inclined peripheral wall portions, intermediate their upper and lower ends, including outwardly and downwardly facing abutment surfaces adapted to abuttingly and seatingly engage the edge portions of said wheel defining the central opening therein.

No references cited.

GRANVILLE Y. CUSTER, JR., *Primary Examiner.*